US007980120B2

(12) United States Patent
Cinpinski et al.

(10) Patent No.: US 7,980,120 B2
(45) Date of Patent: Jul. 19, 2011

(54) FUEL INJECTOR DIAGNOSTIC SYSTEM AND METHOD FOR DIRECT INJECTION ENGINE

(75) Inventors: Kenneth J. Cinpinski, Ray, MI (US);
Byungho Lee, Ann Arbor, MI (US);
Donovan L. Dibble, Utica, MI (US);
Michael J. Lucido, Northville, MI (US);
Mark D. Carr, Fenton, MI (US)

(73) Assignee: GM Global Technology Operations LLC

( * ) Notice: Subject to any disclaimer, the term of this patent is extended or adjusted under 35 U.S.C. 154(b) by 301 days.

(21) Appl. No.: 12/333,794

(22) Filed: Dec. 12, 2008

(65) Prior Publication Data
US 2010/0147058 A1 Jun. 17, 2010

(51) Int. Cl.
*G01M 15/00* (2006.01)
*G01F 9/00* (2006.01)
*G06G 19/00* (2006.01)

(52) U.S. Cl. ........... 73/114.43; 73/114.48; 701/114

(58) Field of Classification Search ........... 701/103, 701/104, 107, 114; 73/114.43, 114.45, 114.51, 73/114.41, 114.48
See application file for complete search history.

(56) References Cited

U.S. PATENT DOCUMENTS

| | | | | |
|---|---|---|---|---|
| 4,206,634 A * | 6/1980 | Taylor et al. | | 73/114.41 |
| 4,438,496 A * | 3/1984 | Ohie | | 701/104 |
| 5,020,362 A * | 6/1991 | Hart et al. | | 73/114.43 |
| 5,241,933 A * | 9/1993 | Morikawa | | 123/198 D |
| 5,445,019 A * | 8/1995 | Glidewell et al. | | 73/114.51 |
| 5,499,538 A * | 3/1996 | Glidewell et al. | | 73/114.41 |
| 5,535,621 A * | 7/1996 | Glidewell et al. | | 73/114.49 |
| 5,616,837 A * | 4/1997 | Leonard et al. | | 73/114.43 |
| 5,708,202 A * | 1/1998 | Augustin et al. | | 73/114.43 |
| 5,715,797 A * | 2/1998 | Minagawa et al. | | 123/497 |
| 5,723,780 A * | 3/1998 | Miwa et al. | | 73/114.43 |
| 5,727,516 A * | 3/1998 | Augustin et al. | | 123/198 DB |
| 5,937,826 A * | 8/1999 | Olson et al. | | 123/447 |
| 5,974,865 A * | 11/1999 | Dambach | | 73/49.7 |
| 6,024,064 A * | 2/2000 | Kato et al. | | 123/179.17 |
| 6,032,639 A * | 3/2000 | Goto et al. | | 123/295 |
| 6,053,147 A * | 4/2000 | Hemmerlein et al. | | 123/447 |
| 6,085,727 A * | 7/2000 | Nakano | | 123/447 |
| 6,223,731 B1 * | 5/2001 | Yoshiume et al. | | 123/497 |
| 6,293,251 B1 * | 9/2001 | Hemmerlein et al. | | 123/447 |
| 6,314,947 B1 * | 11/2001 | Roche | | 123/525 |
| 6,345,606 B1 * | 2/2002 | Ricci-Ottati et al. | | 123/456 |
| 6,349,702 B1 * | 2/2002 | Nishiyama | | 123/456 |
| 6,453,878 B1 * | 9/2002 | Mazet | | 123/497 |
| 6,474,306 B2 * | 11/2002 | Muller et al. | | 123/479 |
| 6,497,223 B1 * | 12/2002 | Tuken et al. | | 123/497 |
| 6,609,501 B2 * | 8/2003 | Doane et al. | | 123/458 |
| 6,647,769 B1 * | 11/2003 | Fujino et al. | | 73/114.41 |
| 6,694,953 B2 * | 2/2004 | Barnes et al. | | 123/500 |
| 6,732,715 B2 * | 5/2004 | Fallahi et al. | | 123/480 |
| 6,786,201 B2 * | 9/2004 | Ohtani | | 123/431 |
| 6,792,917 B2 * | 9/2004 | Kohketsu et al. | | 123/446 |
| 6,823,834 B2 * | 11/2004 | Benson et al. | | 123/299 |
| 6,910,464 B2 * | 6/2005 | Ishikawa et al. | | 123/458 |

(Continued)

*Primary Examiner* — Thomas N Moulis

(57) ABSTRACT

A fuel injector diagnostic system includes a fuel pump control module, a pressure sensor, and a diagnostic module. The fuel pump control module disables delivery of fuel to a fuel rail of an engine. The pressure sensor measures a first pressure of the fuel rail before an injection event and a second pressure of the fuel rail after the injection event on at least one of a plurality of injectors when the engine is running. The diagnostic module diagnoses a fault in the at least one of the injectors based on the first pressure and the second pressure.

22 Claims, 4 Drawing Sheets

U.S. PATENT DOCUMENTS

| | | | |
|---|---|---|---|
| 6,948,480 B2 * | 9/2005 | Eser et al. | 123/495 |
| 6,951,206 B2 * | 10/2005 | Kishimoto | 123/497 |
| 6,971,368 B2 * | 12/2005 | Uchiyama | 123/359 |
| 7,007,676 B1 * | 3/2006 | Schuricht et al. | 123/479 |
| 7,080,550 B1 * | 7/2006 | Goris et al. | 73/114.48 |
| 7,086,838 B2 * | 8/2006 | Thompson et al. | 417/45 |
| 7,143,747 B2 * | 12/2006 | Uchiyama | 123/456 |
| 7,219,005 B2 * | 5/2007 | Mazet | 701/104 |
| 7,267,106 B2 * | 9/2007 | Adachi et al. | 123/436 |
| 7,302,938 B2 * | 12/2007 | Yu et al. | 123/514 |
| 7,392,793 B2 * | 7/2008 | Hayakawa | 123/479 |
| 7,472,690 B2 * | 1/2009 | Takayanagi et al. | 123/446 |
| 7,523,743 B1 * | 4/2009 | Geveci et al. | 123/486 |
| 7,552,717 B2 * | 6/2009 | Dingle | 123/480 |
| 7,558,665 B1 * | 7/2009 | Geveci et al. | 701/104 |
| 7,603,227 B2 * | 10/2009 | Watanabe et al. | 701/113 |
| 7,650,779 B2 * | 1/2010 | Puckett et al. | 73/114.41 |
| 7,717,088 B2 * | 5/2010 | Thomas | 123/478 |
| 7,784,446 B2 * | 8/2010 | Rumpf | 123/497 |
| 2004/0002810 A1 * | 1/2004 | Akuzawa et al. | 701/114 |
| 2007/0251502 A1 * | 11/2007 | Takayanagi et al. | 123/458 |
| 2008/0306648 A1 * | 12/2008 | Takahashi | 701/29 |
| 2009/0084348 A1 * | 4/2009 | Batenburg et al. | 123/294 |
| 2009/0164094 A1 * | 6/2009 | Geveci et al. | 701/103 |
| 2009/0164095 A1 * | 6/2009 | Geveci et al. | 701/103 |
| 2009/0205413 A1 * | 8/2009 | Yamauchi et al. | 73/114.41 |
| 2010/0147058 A1 * | 6/2010 | Cinpinski et al. | 73/114.51 |

* cited by examiner

FUEL INJECTOR DIAGNOSTIC SYSTEM AND METHOD FOR DIRECT INJECTION ENGINE

FIELD

The present disclosure relates to direct injection engines, and more particularly to fuel injector diagnostic systems and methods for direct injection engines.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Fuel and air injection quantities delivered to an engine are controlled to meet fuel economy requirements and emission standards. When fuel injectors function improperly, fuel injection quantities delivered to the engine may deviate from desired levels, resulting in increased emissions and/or decreased fuel economy.

Fuel injector diagnosis may be performed when the engine is shut off. The fuel quantity that flows through an injector may be estimated based on a fuel pressure at a common fuel rail before and after a fuel injection event. The estimated fuel quantity is compared with a desired fuel amount to determine whether the injector functions properly. When the engine is off, the measured fuel pressure is low and may be susceptible to errors due to pressure fluctuations following each fuel injection event. Generally, several fuel injection events are required on the same injector to ensure accurate measurement of the fuel pressure and accurate diagnosis of the injector.

SUMMARY

Accordingly, a fuel injector diagnostic system includes a fuel pump control module, a pressure sensor, and a diagnostic module. The fuel pump control module disables delivery of fuel to a fuel rail of an engine. The pressure sensor measures a first pressure of the fuel rail before an injection event and a second pressure of the fuel rail after the injection event on at least one of a plurality of injectors when the engine is running. The diagnostic module diagnoses a fault in the at least one of the injectors based on the first pressure and the second pressure.

A method of diagnosing a fuel injection system includes disabling a fuel pump when an engine is running, measuring a fuel rail pressure to obtain a first pressure, starting an injection event by injecting fuel through one of a plurality of fuel injectors, measuring the fuel rail pressure to obtain a second pressure after the injection event, and diagnosing a fault in the one of the plurality of fuel injectors based on the first pressure and the second pressure when the engine is in operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
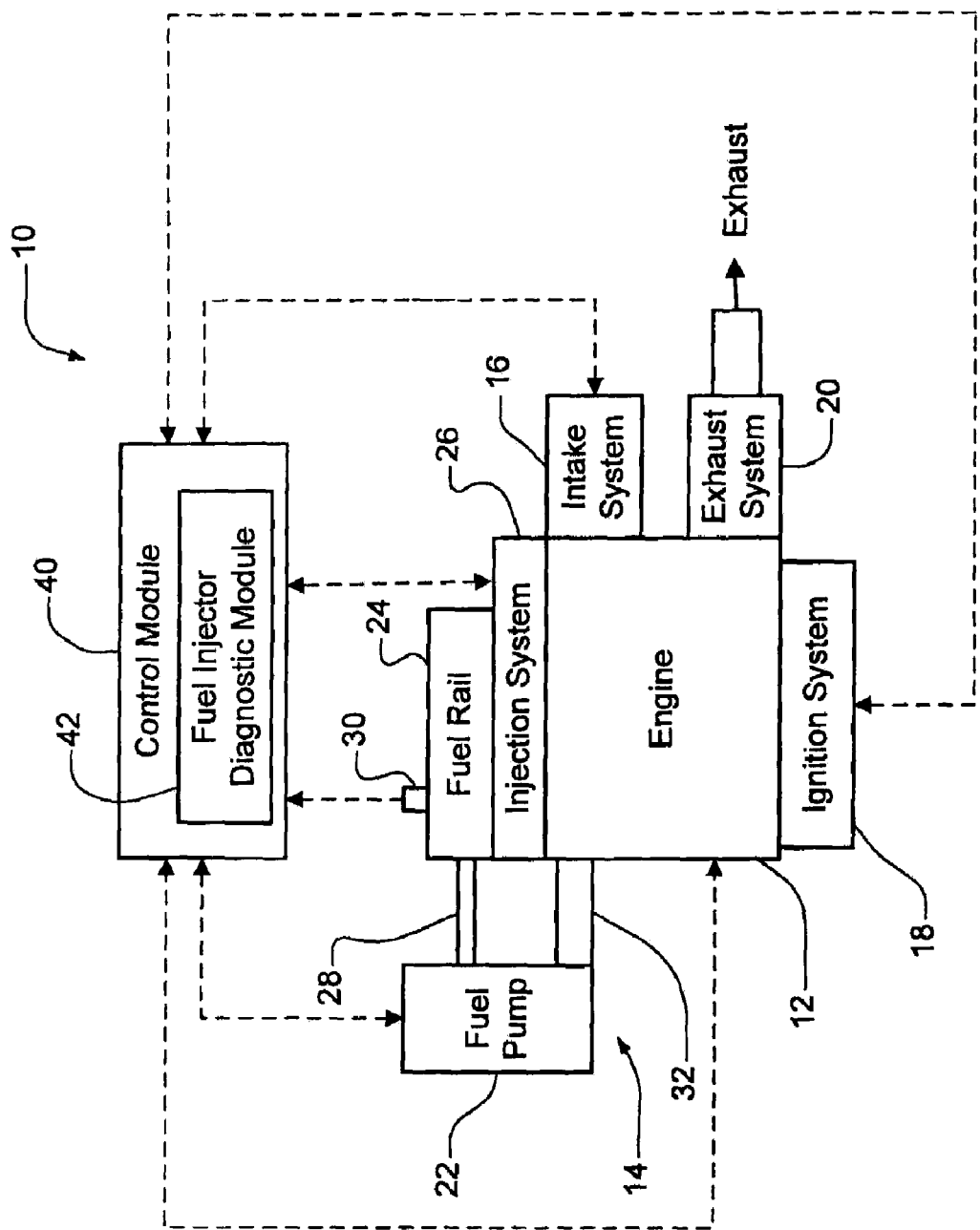
FIG. 1 is a functional block diagram of an engine system that includes a fuel injector diagnostic module according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

The fuel injector diagnostic system in accordance with the teachings of the present disclosure may diagnose a fuel injector when the engine is running, particularly when the engine is idling. During diagnosis, the fuel pump is disabled, and fuel rail pressures before and after an injection event are measured. The fuel injector diagnostic system diagnoses a fault in the injector when a pressure difference before and after the injection event or an actual fuel quantity based on the pressure difference is below a threshold.

Referring to FIG. 1, an engine system 10 in accordance with teachings of the present disclosure includes an engine 12, a fuel system 14, an intake system 16, an ignition system 18, and an exhaust system 20. The fuel system 14 may provide fuel to the engine 12. The engine system 10 is a direct injected system where fuel is injected directly into the compressed air in the combustion chamber and at a high pressure. The intake system 16 provides air to the engine 12. The ignition system 18 provides a spark to ignite the fuel and air mixture in a combustion chamber of the engine 12. Combustion of the air-fuel mixture in the engine 12 provides power that is transferred to a transmission (not shown) and concurrently produces exhaust. The exhaust exits the engine 12 through the exhaust system 20.

The fuel system 14 includes a fuel pump 22, a fuel rail 24, an injection system 26, a fuel line 28, and a pressure sensor 30. The fuel pump 22 may be a piston pump that provides high pressure fuel to the fuel rail 24 through a fuel line 28. An engine crankshaft (not shown) drives the fuel pump 22 through a camshaft mechanism 32. The fuel pump 22 controls a fuel mass quantity that flows to the fuel rail 24 by adjusting the fuel mass quantity that is trapped within a piston cylinder of the fuel pump.

The fuel pump 22 delivers fuel under pressure through the fuel line 28 to the fuel rail 24. The fuel rail 24 delivers the high pressure fuel to the injection system 26 at the direct injection inputs of the engine 12. The pressure sensor 30 is provided at the fuel rail 24 to monitor the rail pressure. Excess fuel at the fuel rail 24 may be returned to a fuel tank (not shown) through a fuel return line (not shown). The fuel return line may contain a pressure regulator (not shown). The injection system 26 includes an injector for each cylinder. The plurality of injectors communicate with the fuel rail 24 and provide fuel sequentially and directly to the engine combustion chambers.

A control module 40 communicates with the engine 12, the fuel pump 22, the fuel rail 24, the injection system 26, the intake system 16, the ignition system 18, and the pressure sensor 30. The control module 40 includes a fuel injector diagnostic module 42 that diagnoses a fault in the plurality of injectors of the injection system when the engine 12 is running.

Figure 2:
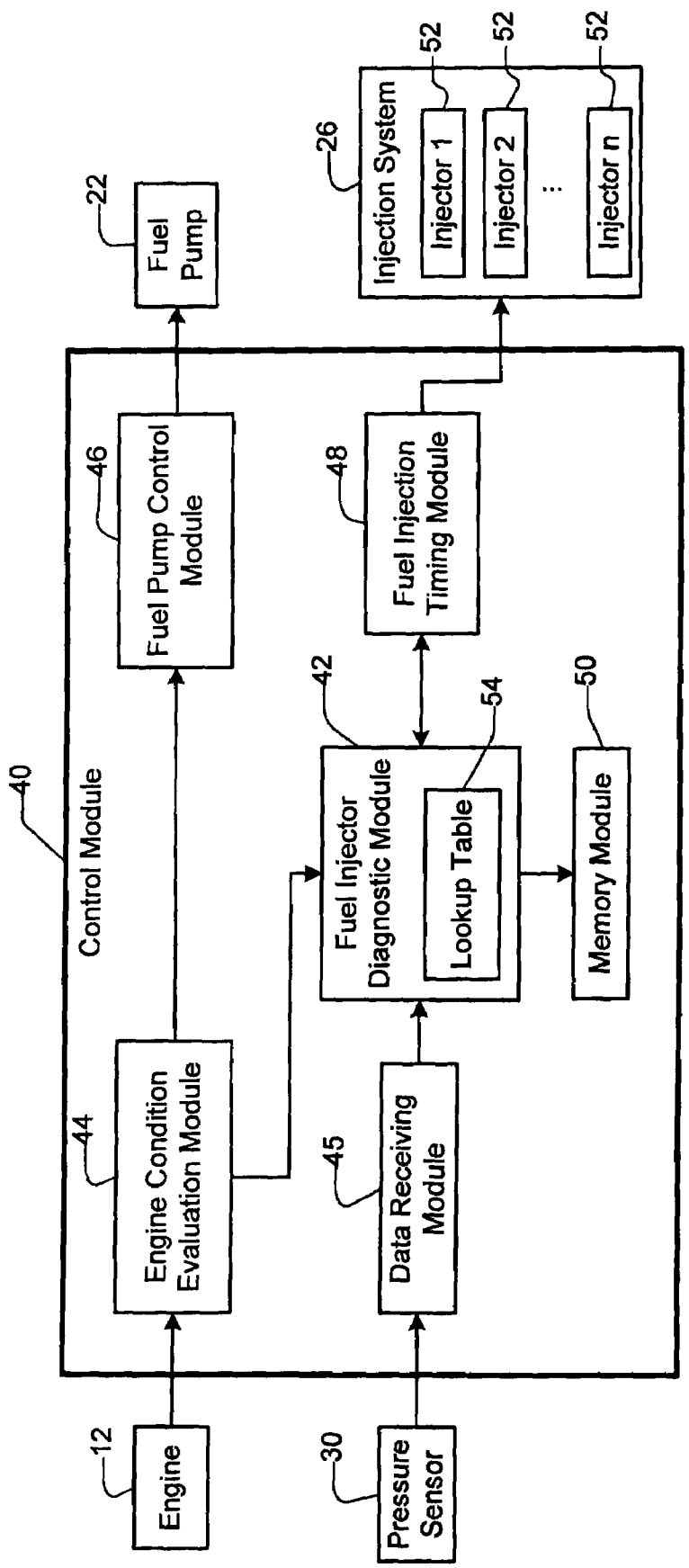
FIG. 2 is a functional block diagram of a control module that includes a fuel injector diagnosis module according to the present disclosure.

Referring to FIG. 2, the control module 40 includes the fuel injector diagnostic module 42, an engine condition evaluation module 44, a data receiving module 45, a fuel pump control module 46, a fuel injection timing module 48, and a memory module 50.

The fuel pump control module 46 communicates with the fuel pump 22 to control the fuel mass quantity delivered by the fuel pump 22 to the fuel rail 24. The fuel injection timing module 48 communicates with the injection system 26 to control fuel injection timing of the plurality of injectors 52. During normal engine operation (i.e., when injector diagnosis is not performed), the fuel pump control module 46 may command the fuel pump 22 to deliver a requested amount of fuel to the fuel rail 24. The injection timing module 48 may activate the plurality of injectors 52 to inject fuel sequentially according to a requested timing commanded by the control module 40.

The control module 40 performs fuel injector diagnosis when the engine 12 is running. When the engine is running, the fuel rail pressure for a direct injection engine is generally high, for example only, between 6 MPa (870 psi) and 20 MPa (2900 psi). Due to the high rail pressure, pressure fluctuations following the fuel injection event may have less effect on accurate measurement of the rail pressure.

More specifically, the engine condition evaluation module 44 communicates with the engine 12 and monitors the engine operating conditions to determine whether a diagnostic condition is present. The diagnostic condition is determined based on at least one of a fuel rail pressure, an engine speed, and an engine load. The diagnostic conditions may be present, for example only, when the engine is idling, when the rail pressure is above a threshold, when the engine speed (RPM) is low, and/or when the engine load is high. When the engine 12 runs at a low RPM, there is more time to damp out the pressure oscillations and thus the accuracy of the rail pressure is less affected by the pressure oscillations. When the engine 12 runs at a high load, the pressure difference (pressure drop) before and after the injection event is relatively large due to delivery of a large amount of fuel through the injector. As such, the pressure fluctuations are relatively small compared with the pressure drop. When one or more of the diagnostic conditions are present, the engine condition evaluation module 44 may activate the injector diagnostic module 42 to perform fuel injector diagnosis.

During diagnosis, the fuel pump control module 46 may disable the fuel pump 22 to deliver zero fuel to the fuel rail 24. The fuel rail 24 may reach a state that is approximately a steady state prior to an injection event on a specific injector (n) to be diagnosed. Maintaining the fuel rail 24 close to a steady-state may minimize pressure fluctuations to ensure more accurate measurement of the rail pressure.

Figure 3:
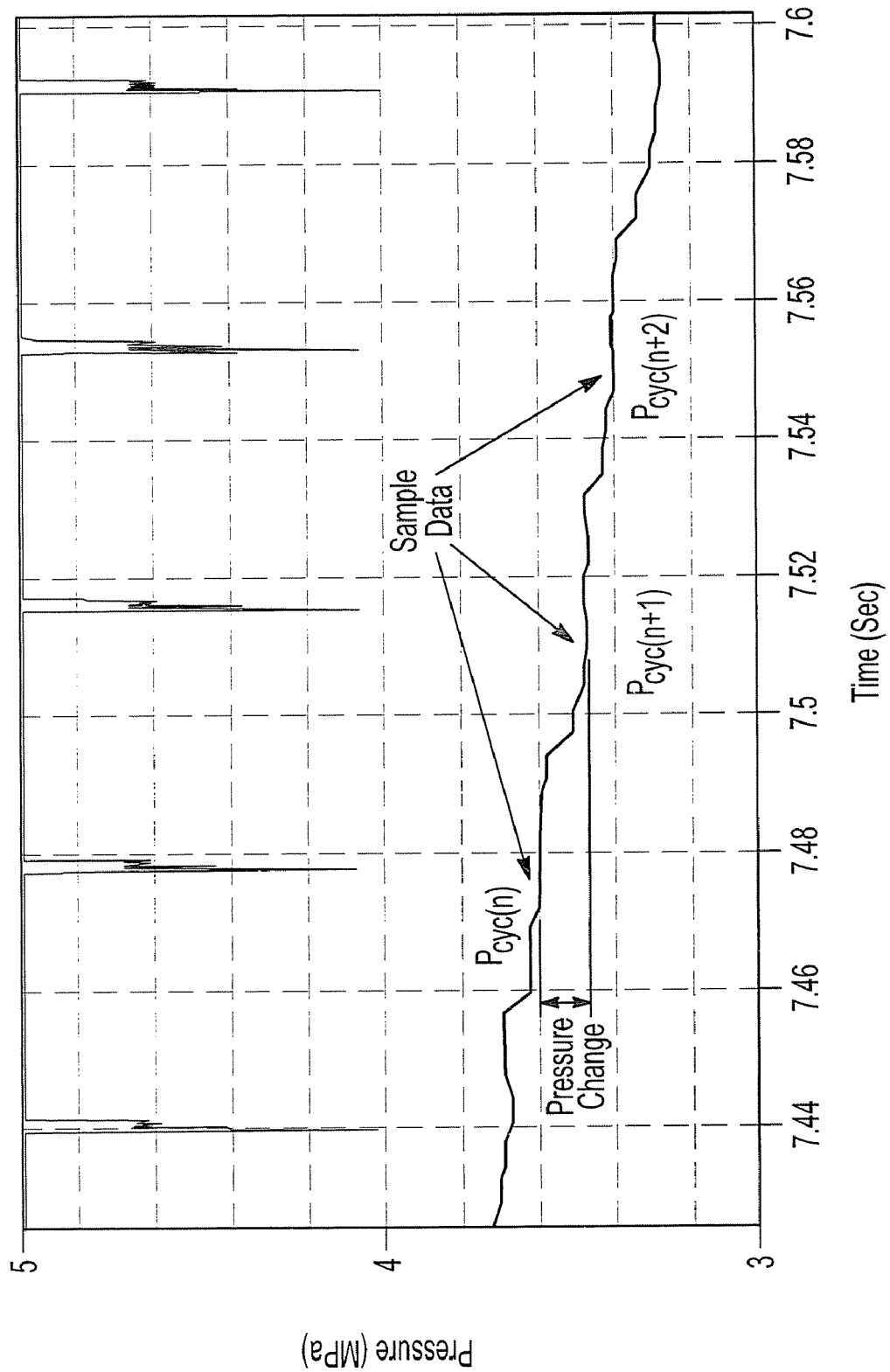
FIG. 3 is a graph illustrating the wave form of output signals generated by a pressure sensor.

Referring to FIG. 3, the data receiving module 45 receives pressure data from the pressure sensor 30. The pressure sensor 30 measures a first rail pressure $P_{cyl(n)}$ before the injection event. Next, the injector (n) for cylinder (n) may inject a fuel quantity into a combustion chamber of the cylinder (n) of the engine 12. After the injection event on the injector (n), the pressure sensor 30 measures a second rail pressure $P_{cyl(n+1)}$.

The second rail pressure $P_{cyl(n+1)}$ is less than the first rail pressure $P_{cyl(n)}$ because a fuel quantity has left the fuel rail 24 through the injector (n).

The first rail pressure (start pressure) $P_{cyl(n)}$ and the second rail pressure (end pressure) $P_{cyl(n+1)}$ are recorded in the data receiving module 45. Signals indicative of the start pressure and the end pressure may be sent to the fuel injector diagnostic module 42 for diagnosis. In addition, the wave form of the pressure signals is sent to the fuel injector diagnosis module 42. Thereafter, the diagnosis may continue to be performed on the next injector (n+1). The end pressure $P_{cyl(n+1)}$ obtained from the prior injection event for injector (n) becomes the start pressure for the subsequent injection event on the injector (n+1). The wave form of the pressure signals is also recorded. After a subsequent injection event on the injector (n+1), the end pressure $P_{cyl(n+2)}$ for the injector (n+1) may be measured and sent to the fuel injector diagnostic module 42. The same pressure data receiving steps may be repeated on injector (n+2) and the remaining injectors until all injectors are diagnosed.

After the pressure data are obtained, the fuel pump control module 46 may activate the fuel pump 22 to resume a normal closed loop operation and to return the fuel rail 24 to a predetermined rail pressure for normal engine operations. Injection diagnosis may be scheduled at a later time.

Referring back to FIG. 2, the fuel injector diagnostic module 42 may include a lookup table 54 of empirical data showing the relationship among a start rail pressure, an end rail pressure, and a fuel quantity. The actual fuel quantity may be determined based on the start pressure and the end pressure. When the pressure drop or the actual fuel quantity for a specific injection event on a specific injector is below a threshold value, the fuel injector diagnostic module 42 may determine a fault in the specific injector. A fault signal may be sent to the memory module 50 for later analysis. Because the rail pressure is high when the engine is running, the fuel injector diagnostic module 42 may diagnose the injector based on one single injection event of each injector.

Alternatively, the pressure data receiving steps may be repeated on the same injector. An actual fuel quantity that flows through the injector at the specific injection event may be obtained by correlating the start pressure, the end pressure to the fuel quantity. The actual fuel quantity for the specific injection event is recorded. After a number of fuel diagnoses have been performed on the same injector, the fuel injector diagnostic module 42 may sum the mass quantities for a number of injection events on the same injector. In addition, the injection pulse widths corresponding to the transient fuel pressure wave may be summed for a number of injection events on the same injector. The cumulative fuel mass quantities may be divided by the cumulative pulse widths to arrive at a value indicative of an average fuel flow rate through the specific injector. The fuel flow rate for the specific injector may be compared with similar values associated with other injectors. When the specific injector has a flow rate that is numerically distant from those of the majority of the injectors, the fuel injector diagnostic module 42 may determine that the injector is an outlier and diagnose a fault in the specific injector. Alternatively, when the fuel flow rate is below a threshold, the fuel injector diagnostic module 42 diagnoses a fault in the specific injector.

Figure 4:
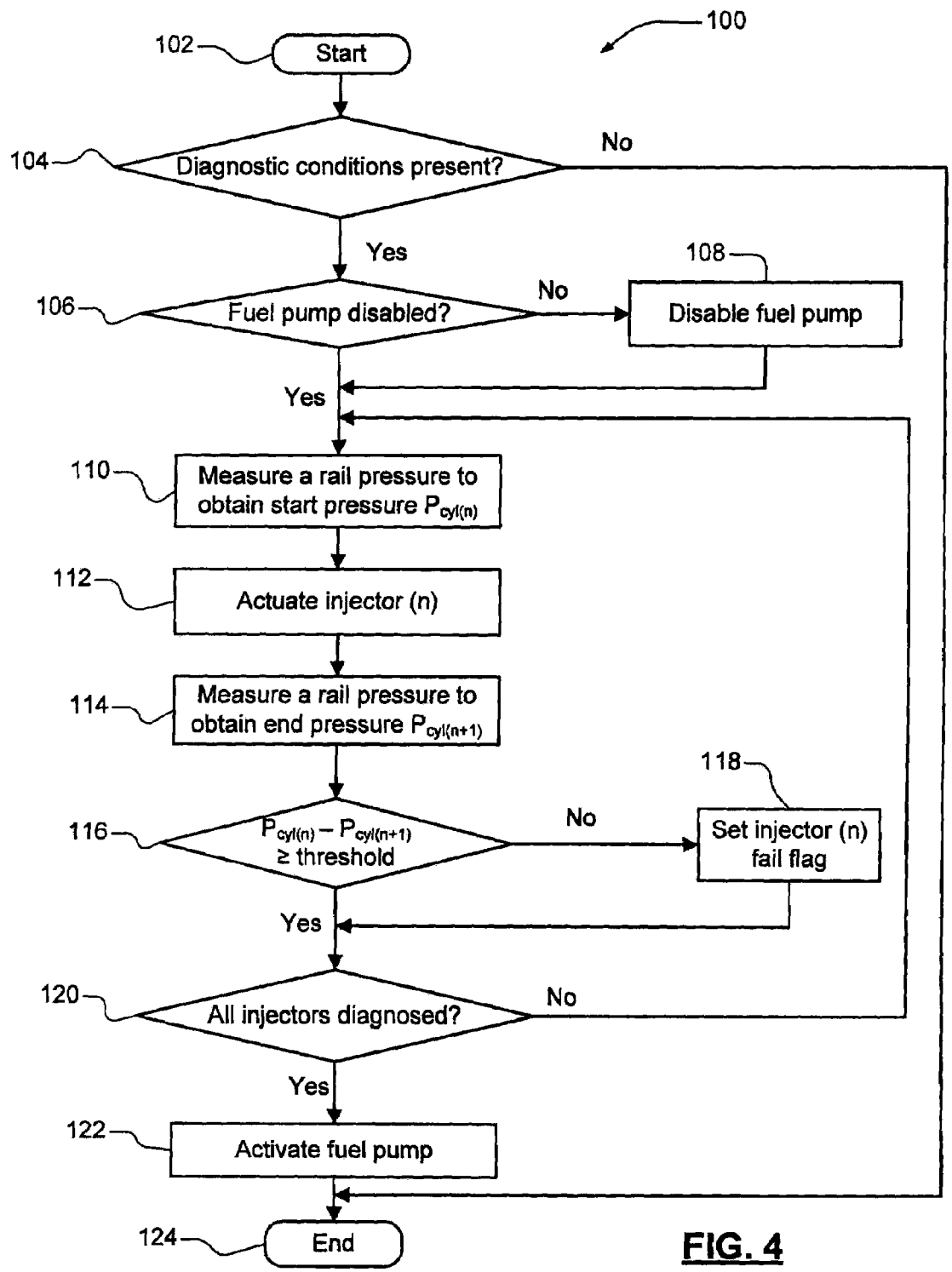
FIG. 4 is a flow diagram of a method of diagnosing fuel injectors according to the present disclosure.

Referring to FIG. 4, a diagnostic method 100 starts in step 102. The engine condition evaluation module 44 determines whether one or more of the predetermined diagnostic conditions are present in step 104. If present, the control module 40 determines whether the fuel pump is disabled in step 106. If the fuel pump 22 is not disabled, the fuel pump control module 46 disables the fuel pump 22 in step 108. The pressure sensor measures a rail pressure to obtain a start pressure $P_{cyl(n)}$ in step 110. A signal indicative of the start pressure $P_{cyl(n)}$ is sent to the fuel injector diagnostic module 42.

The fuel injection timing module activates the injector (n) that is being diagnosed in step 112 to inject a desired fuel quantity into the cylinder (n). The pressure sensor measures a rail pressure to obtain an end pressure $P_{cyl(n+1)}$ in step 114. A signal indicative of the end pressure $P_{cyl(n+1)}$ is sent to the fuel injector diagnostic module 42.

The fuel injector diagnostic module 42 determines whether the pressure drop (pressure difference between $P_{cyl(n)}$ and $P_{cyl(n+1)}$) is equal to or above a threshold value in step 116. If the pressure drop is below a threshold, the fuel injector diagnostic module diagnoses a fault in the injector (n) and an injector (n) fail flag may be sent to the memory module 50 in step 118. If the pressure drop is equal to or above the threshold, the fuel injector diagnostic module 42 may diagnose no fault in the injector (n). Thereafter, the fuel injector diagnostic module determines whether all injectors are tested in step 120. If false, the same steps from step 110 through step 120 may be repeated until all injectors are diagnosed. When all injectors are diagnosed, the fuel pump control module activates the fuel pump to deliver fuel to the fuel rail to resume normal engine operations in step 122. The method 100 ends at step 124.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A fuel injector diagnostic system comprising:
a fuel pump control module that commands a fuel pump to supply no fuel to a fuel rail for a period, wherein the fuel pump is driven by a camshaft of an engine;
a pressure sensor that, during the period, measures a first pressure of the fuel rail before an injection event by a fuel injector and a second pressure of the fuel rail after the injection event by the fuel injector; and
a diagnostic module that diagnoses a fault of the fuel injector based on the first pressure and the second pressure.

2. The fuel injector diagnostic system of claim 1 wherein the fuel pump control module commands the fuel pump to supply no fuel to the fuel rail for the period when a diagnostic condition is present.

3. The fuel injector diagnostic system of claim 2 further comprising an engine evaluation module that activates the diagnostic module when the diagnostic condition is present.

4. The fuel injector diagnostic system of claim 3 wherein the diagnostic condition is determined based on at least one of an engine speed, an engine load, and a fuel rail pressure.

5. The fuel injector diagnostic system of claim 3 wherein the diagnostic module is activated when the engine is idling.

6. The fuel injector diagnostic system of claim 1 wherein the diagnostic module diagnoses a fault of the fuel injector when the difference between the first pressure and the second pressure is below a threshold.

7. The fuel injector diagnostic system of claim 1 wherein the diagnostic module includes a lookup table that correlates the first pressure and the second pressure to a fuel quantity that flows through the fuel injector.

8. The fuel injector diagnostic system of claim 7 wherein the diagnostic module determines a fault of the fuel injector when the fuel quantity is below a threshold.

9. A method of diagnosing a fuel injection system comprising:
commanding a fuel pump to supply no fuel to a fuel rail for a period, wherein the fuel pump is driven by a camshaft of an engine;
during the period, measuring a first pressure of a fuel rail before an injection event by a fuel injector;
during the period, measuring a second pressure of the fuel rail after the injection event by the fuel injector; and
diagnosing a fault of the fuel injectors based on the first pressure and the second pressure.

10. The method of claim 9 wherein the fuel pump is commanded to supply no fuel to the fuel rail for the period when a diagnostic condition is present.

11. The method of claim 10 wherein the diagnostic condition is determined based on at least one of an engine speed, an engine load, a fuel injection pressure, and a fuel rail pressure.

12. The method of claim 9 further comprising diagnosing a fault of the fuel injector when the difference between the first pressure and the second pressure is below a threshold.

13. The method of claim 9 further comprising correlating the first pressure and the second pressure to a fuel quantity that flows through the fuel injector.

14. The method of claim 13 further comprising diagnosing a fault of the fuel injectors when the fuel quantity is below a threshold.

15. The fuel injector diagnostic system of claim 1, wherein during the period the pressure sensor also measures first and second pressures of the fuel rail before and after fuel injection events, respectively, by each of N other fuel injectors of the engine, wherein N is an integer greater than or equal to one.

16. The fuel injector diagnostic system of claim 15, wherein the diagnostic module determines a fuel quantity flowing through each of the N other fuel injectors based on the measured first and second pressures for each of the N other fuel injectors.

17. The fuel injector diagnostic system of claim 16, wherein the diagnostic module (i) calculates a first sum of the determined fuel quantity over a plurality of measurement cycles for the fuel injector and for each of the N other fuel injectors and (ii) calculates a second sum injection pulse widths over the plurality of measurement cycles for the fuel injector and for each of the N other fuel injectors.

18. The fuel injector diagnostic system of claim 17, wherein the diagnostic module calculates a quotient of the first sum and the second sum for the fuel injector and for each of the N other fuel injectors, and diagnoses a fault for ones of the fuel injector and the N other fuel injectors that have a quotient that differs by more than a predetermined amount from the quotients of others of the fuel injector and the N other fuel injectors.

19. The method of claim 9, further comprising during the period measuring first and second pressures of the fuel rail before and after fuel injection events, respectively, by each of N other fuel injectors, wherein N is an integer greater than or equal to one.

20. The method of claim 19, further comprising determining a fuel quantity flowing through each of the N other fuel injectors based on the measured first and second pressures for each of the N other fuel injectors.

21. The method of claim 20, further comprising (i) calculating a first sum of the determined fuel quantity over a plurality of measurement cycles for the fuel injector and for each of the N other fuel injectors and (ii) calculating a second sum injection pulse widths over the plurality of measurement cycles for the fuel injector and for each of the N other fuel injectors.

22. The method of claim 21, further comprising calculating a quotient of the first sum and the second sum for the fuel injector and for each of the N other fuel injectors, and diagnosing a fault for ones of the fuel injector and the N other fuel injectors having a quotient that differs by more than a predetermined amount from the quotients of others of the fuel injector and the N other fuel injectors.

* * * * *